(No Model.) 2 Sheets—Sheet 1.
F. H. FICKETT.
CABINET BATH TUB.
No. 259,300. Patented June 13, 1882.
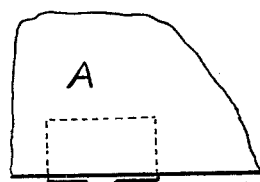
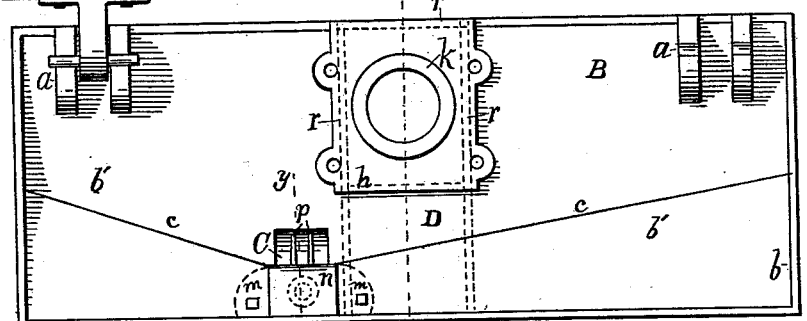
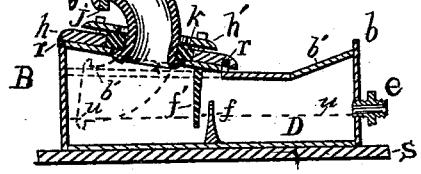
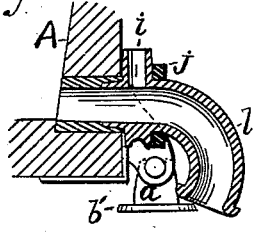
Witnesses:
Orville C. Rorabaugh
Julius ...
Inventor:
Franklin H. Fickett,
By Wm. Zimmerman
Atty.

(No Model.)
F. H. FICKETT.
CABINET BATH TUB.
No. 259,300.　　　　　　　Patented June 13, 1882.
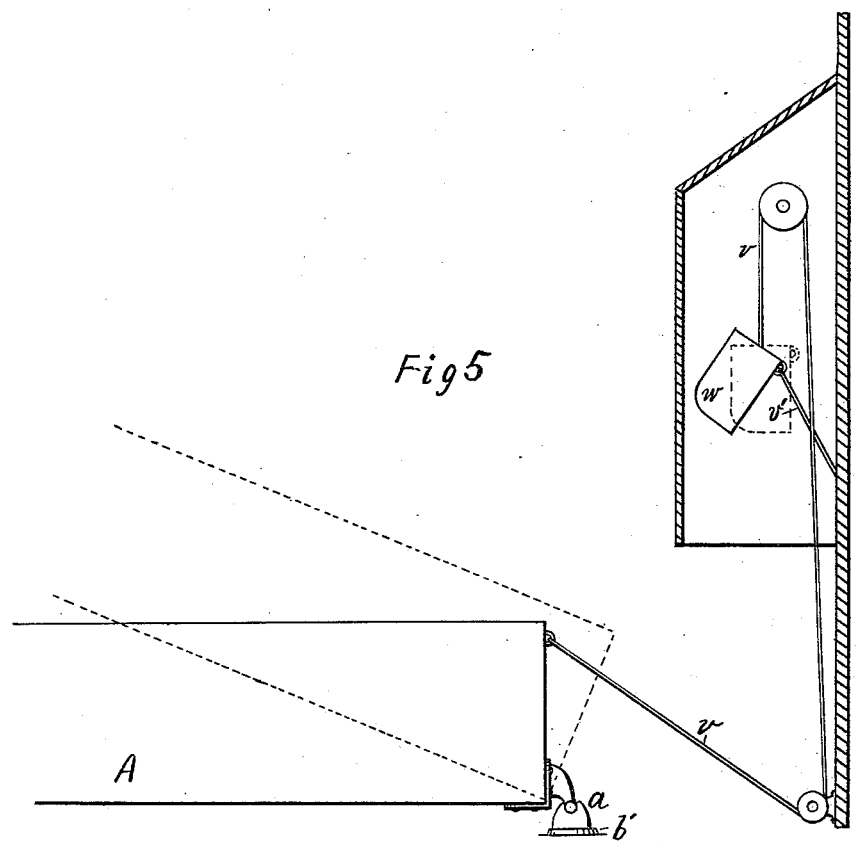
Witnesses:
Orville C. Rorabaugh
Julius Stern
Inventor:
Franklin H. Fickett
By Wm Zimmerman Atty

UNITED STATES PATENT OFFICE.

FRANKLIN H. FICKETT, OF CHICAGO, ILLINOIS.

CABINET BATH-TUB.

SPECIFICATION forming part of Letters Patent No. 259,300, dated June 13, 1882.

Application filed February 15, 1882. (No model.)

*To all whom it may concern:*

Be it known that I, FRANKLIN H. FICKETT, of Chicago, in the county of Cook and State of Illinois, have invented certain new and useful Improvements in Bath-Tubs; and I hereby declare the following to be a full, clear, and exact description thereof, which will enable others skilled in the art to which my invention relates to make and use the same, reference being had to the accompanying drawings, forming a part hereof, and in which—

Figure 1 represents a plan view of the drip-pan B, with a part of the tub A attached to one hinge. Fig. 2 represents a sectional view of the drip-pan and discharge-pipe $l$, taken on the line $x$ $x$. Fig. 3 represents a sectional view of the pipe $l$, attached to the bath-tub A, and the hinge $a$, connecting the bath-tub and drip-pan. Fig. 4 represents the trap from the top of the drip-pan, taken on the line $y$ $y$. Fig. 5 represents an improved arrangement of my bath-tub and weight.

Like letters of reference indicate like parts.

The object of my invention is to improve the details of construction of cabinet bath-tubs, applicable to that class of bath-tubs patented to me April 19th, 1881, No. 240,313.

In the drawings, A represents a portion of a bath-tub, and B a drip-pan, to which the bath-tub is hinged at $a$. The top of said drip-pan is surrounded by a shallow rim, $b$, and is depressed, so that the lowest part is along the line $c$, which forms a channel to the trap C, from which leads a small waste-pipe, $d$. Said trap is placed alongside of a trap, D, extending across the width of the pan at its center, from the outer end of which leads a waste-pipe, $e$.

From about the center of the trap D rises a partition, $f$, to nearly the top of the box. Over the trap D is placed a cover, $h$, provided with a channel, into which is placed a packing of rubber or like material, $k$, through which passes a curved pipe, $l$, attached to the end of the bath-tub, so curved and placed as to form the segment of a circle the center of which is the center of the hinges $a$, on which the bath-tub works. On the upper end of said pipe enters the overflow-pipe $i$, and immediately below said pipe $i$ is a shoulder on the pipe $l$, against which is placed an elastic ring, $j$, which, when the bath-tub is raised into the vertical position, presses upon the cover $h'$, which covers and holds down the packing $k$, and thus seals the joint around the pipe against any leakage of gas. The side walls of the trap D rise above the top $b'$ and form a separate box under the cover $h$, as shown, and on the top of said box is laid a packing, $r$, to make a gas-tight joint. The trap C catches such water as may by accident leak from the bath-tub, and is formed by the pocket, into which is placed the removable piece $n$, provided with prongs $p$ to form a strainer. A ball-valve, $o$, covers an opening through the lower part of $n$. A cover, $m$, lies over and holds the piece $n$ in place. In Fig. 1 the cover $m$ is shown in dotted outline.

To the cover $h$ is attached a plate, $f'$, which dips below the water-line $u$, and so forms a gas-trap. The line $t$ shows the water-line in the trap C.

The floor of the cabinet is shown at $s$.

The pipes $d$ and $e$ may be conducted into one main or run separately. By this construction of my bath-tub all danger of slop is avoided.

Another part of my invention is shown in the arrangement of the weight $w$, cords $v$ $v'$, and bath-tub A. As is well known, the most difficult part in raising the tub is to start it from the floor to about the position shown in the dotted outline. To overcome this said difficulty I construct a thick weight, $w$, to the center of the top of which is attached the cord $v$, and on its rear upper edge is attached a cord, $v'$, of such length as to allow the weight free play in every way until, when the bath-tub descends to or below the position shown in dotted outline, the cord $v'$ becomes taut, and in resisting throws the weight from the position shown in dotted outline to that shown in full outline, thereby throwing considerably increased weight upon the cord $v$ for a short time.

What I claim as new is—

1. In combination with a hinged and vertically-rising bath-tub provided with curved discharge-pipe $l$, a drip-pan, B, provided with trap D, substantially as specified.

2. The combination, with a hinged bath-tub,

A, provided with curved discharge-pipe *l*, of drip-pan B, provided with trap D, and the packings *j* and *k*, substantially as specified.

3. The drip-pan B, provided with separate traps D and C, and discharge-pipes *d* and *e*, substantially as specified.

4. In combination with a drip-pan, B, provided with traps C and D, the removable piece *n*, and valve *o*, substantially as specified.

5. In a cabinet bath-tub, the combination of the hinged bath-tub A and weight *w*, the suspending-cord *v*, and resisting-cord *v'*, arranged to operate substantially as specified.

FRANKLIN H. FICKETT.

Witnesses:
WM. ZIMMERMAN,
O. C. RORABAUGH.